US012802020B2

(12) United States Patent
Maitrejean et al.

(10) Patent No.: US 12,802,020 B2
(45) Date of Patent: Nov. 17, 2026

(54) SHARING OF EXPERIENCE WITHOUT COMMUNICATION OF DATA OR KNOWLEDGE

(71) Applicant: Smiths Detection France S.A.S., Vitry sur Seine (FR)

(72) Inventors: Serge Maitrejean, Vitry-sur-Seine (FR); Luis Tobias, Vitry-sur-Seine (FR)

(73) Assignee: SMITHS DETECTION FRANCE S.A.S., Vitry-sur-seine (FR)

( * ) Notice: Subject to any disclaimer, the term of this patent is extended or adjusted under 35 U.S.C. 154(b) by 0 days.

(21) Appl. No.: 18/569,340

(22) PCT Filed: Jun. 13, 2022

(86) PCT No.: PCT/GB2022/051480
§ 371 (c)(1),
(2) Date: Dec. 12, 2023

(87) PCT Pub. No.: WO2022/263798
PCT Pub. Date: Dec. 22, 2022

(65) Prior Publication Data

US 2024/0281749 A1 Aug. 22, 2024

(30) Foreign Application Priority Data

Jun. 14, 2021 (GB) ..................................... 2108455

(51) Int. Cl.
*G06Q 10/0831* (2023.01)
*G06Q 50/26* (2024.01)

(52) U.S. Cl.
CPC ......... *G06Q 10/0831* (2013.01); *G06Q 50/26* (2013.01)

(58) Field of Classification Search
None
See application file for complete search history.

(56) References Cited

U.S. PATENT DOCUMENTS

2017/0206498 A1* 7/2017 Hamm ............... G06Q 10/0833
2019/0182122 A1* 6/2019 Kushnir .............. H04L 41/0853
(Continued)

FOREIGN PATENT DOCUMENTS

CN 110264116 A * 9/2019

OTHER PUBLICATIONS

PCT International Search Report and Written Opinion, Application No. PCT/GB2022/051480, dated Aug. 26, 2022, 12 pages.
(Continued)

*Primary Examiner* — George Chen
(74) *Attorney, Agent, or Firm* — Armstrong Teasdale LLP

(57) ABSTRACT

A computer-implemented method is provided for sharing, between a plurality of entities managing cargo, experience of cargo data processing by the plurality of entities. The method includes a local learner of each entity building a local model of the cargo data processing by the entity in the plurality of entities, a global learner, separate from the plurality of entities, obtaining at least a first relevant part of the respective local models built by each of the respective local learners, the global learner building a global model of the cargo data processing by the plurality of entities, the local learner of each entity obtaining at least a second relevant part of the global model built by the global learner, and the local learner of each entity outputting data about the cargo data processing by the entity in the plurality of entities.

19 Claims, 2 Drawing Sheets

(56) References Cited

U.S. PATENT DOCUMENTS

| | | | | |
|---|---|---|---|---|
| 2020/0050893 | A1* | 2/2020 | Suresh .................... | G06T 11/40 |
| 2020/0193196 | A1* | 6/2020 | Saydag .................. | G06V 10/74 |
| 2020/0272899 | A1 | 8/2020 | Dunne et al. | |
| 2020/0285980 | A1 | 9/2020 | Sharad et al. | |
| 2020/0334524 | A1 | 10/2020 | Sprague et al. | |

OTHER PUBLICATIONS

Nicoleta Gonzalez Canelas et al., "Federated Learning for Spanish Ports as an Aid to Digitization", Journal of Konbin, vol. 51, No. 2, Jun. 1, 2021, p. 1-17, Retrieved from the Internet: URL:https://sciendo.com/pdf/10.2478/jok-2021-0018.

Avnet Silica, "Customs and Border Protection: IoT Gets The Goods", Oct. 31, 2020 (Oct. 31, 2020), Smart Industry Magazine, Oct. 31, 2020, 10 pages, Retrieved from the Internet: URL:https://www.avnet.com/wps/portal/silica/resources/article/customs-and-border-protection-iot-gets-the-goods/.

Ekkono Solutions AB, "Federated Learning", Short White Paper, May 1, 2020, 7 pages, Retrieved from the Internet: URL:https://www.ekkono.ai/wp-content/uploads/2020/12/SWP_Federated_Learning_Ekkono_Solutions_May_2020.pdf.

Christopher Nelson, "Machine learning for detection of trade in strategic goods: an approach to support future customs enforcement and outreach", World Customs Journal, vol. 14, No., 2, Sep. 1, 2020, pp. 119-130, Retrieved from the Internet: URL:https://worldcustomsjournal.org/Archives/Volume%2014,%20Number%202%20(Oct%202020)/1902%2001%20WCJ%20v14n2%20Nelson.pdf?_t=1603239884.

Jonathan Koh, "SMART border for cargo, passenger and transport—practical implementations and best practices", Jun. 13, 2019, 30 pages, Retrieved from the Internet: URL:https://na.eventscloud.com/file_uploads/746e036613cf2b67bf9f9844a96f5a7b_2_Jonathan_Koh_Nuctech.pdf.

Jaccard et al., "Automated detection of smuggled high-risk security threats using Deep Learning", arXiv:1609.02805v1 [cs. CV] Sep. 9, 2016; 7 pages.

McMahan et al., "Communication-Efficient Learning of Deep Networks from Decentralized Data", JMLR: W&CP vol. 54, Proceedings of the 20th International Conference on Artificial Intelligence and Statistics (AISTATS) 2017; 11 pages.

* cited by examiner

SHARING OF EXPERIENCE WITHOUT COMMUNICATION OF DATA OR KNOWLEDGE

CROSS-REFERENCE TO RELATED APPLICATIONS

The present application is a national stage entry of PCT/GB2022/051480 filed on Jun. 13, 2022, which claims the benefit of GB Patent Application No. 2108455.3 filed on Jun. 14, 2021, the contents of which are hereby incorporated by reference in their entirety.

BACKGROUND

The disclosure relates, but is not limited to, a computer-implemented method for sharing, between a plurality of entities managing cargo, experience of cargo data processing by the plurality of entities. The disclosure also relates to a corresponding system and a computer program or a computer program product.

Sharing of knowledge and data between a plurality of separate entities managing cargo, such as customs organizations, is sometimes difficult. Knowledge and data are often considered critical assets, and governments are often reluctant to share them with other countries. Furthermore, regulations may prevent explicit disclosure of knowledge and data based on privacy grounds.

BRIEF DESCRIPTION

Aspects and embodiments of the disclosure are set out in the appended claims and aim to address at least some of the above described technical problems and other problems. These and other aspects and embodiments of the disclosure are also described herein.

Embodiments of the present disclosure provide a new method of collaboration between a plurality of separate entities managing cargo, such as customs organizations.

Embodiments may provide a method for sharing experience of cargo data processing by the plurality of entities, between the plurality of separate entities. Embodiments may enable building a new way of processing cargo data, common to the plurality of entities. In embodiments, the building of the common way may use data and knowledge from each entity, locally, but does not use communication of cargo data or of knowledge of cargo data processing between any of the entities. The experience of cargo data processing by the plurality of entities is shared, and embodiments may enable each entity to enlarge the scope of their practice of cargo data processing and to make it more pertinent. Embodiments may benefit to all of the entities facing other situation of cargo data processing, such as assessing the risks associated with the cargo or such as cargo inspection such as automatic detection of objects of interest.

Embodiments of the present disclosure may provide a way of processing cargo data which is beneficial to the plurality of separate entities. Embodiments may enhance large collaborations between the plurality of entities.

The building of the common way does not use communication of cargo data or of knowledge of cargo data processing between any of the entities, and embodiments of the present disclosure may provide the above-mentioned advantages whilst complying with privacy regulations.

Some particular embodiments are described below with reference to the drawings. These embodiments are presented with particular combinations of features. For the avoidance of doubt, the disclosure of this application is intended to be considered as a whole. Any feature of any one of the examples disclosed herein may be combined with any features of any of the other examples disclosed herein. The mere description of two features in collocation should not be taken to imply that either is essential to the other, nor inextricably linked to it.

Features of methods may be implemented in suitably configured hardware, and the functionality of the specific hardware described herein may be employed in methods which may implement that same functionality using other hardware.

BRIEF DESCRIPTION OF DRAWINGS

Embodiments of the disclosure will now be described in detail, by way of example only, with reference to the accompanying drawings, in which.

In the drawings like reference numerals are used to indicate like elements.

DETAILED DESCRIPTION

Figure 1:
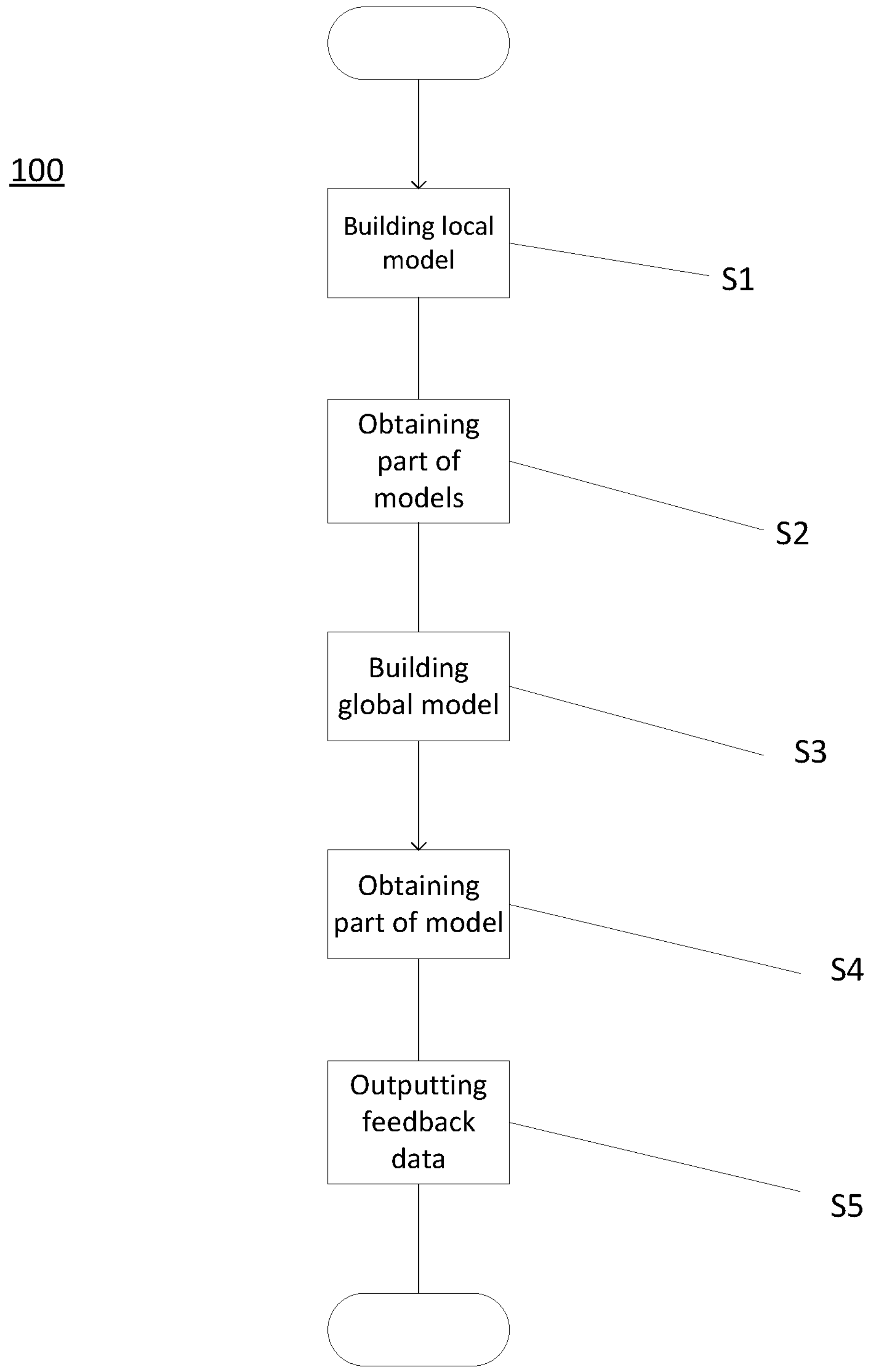
FIG. 1 schematically illustrates an example method according to the disclosure.
Figure 2:
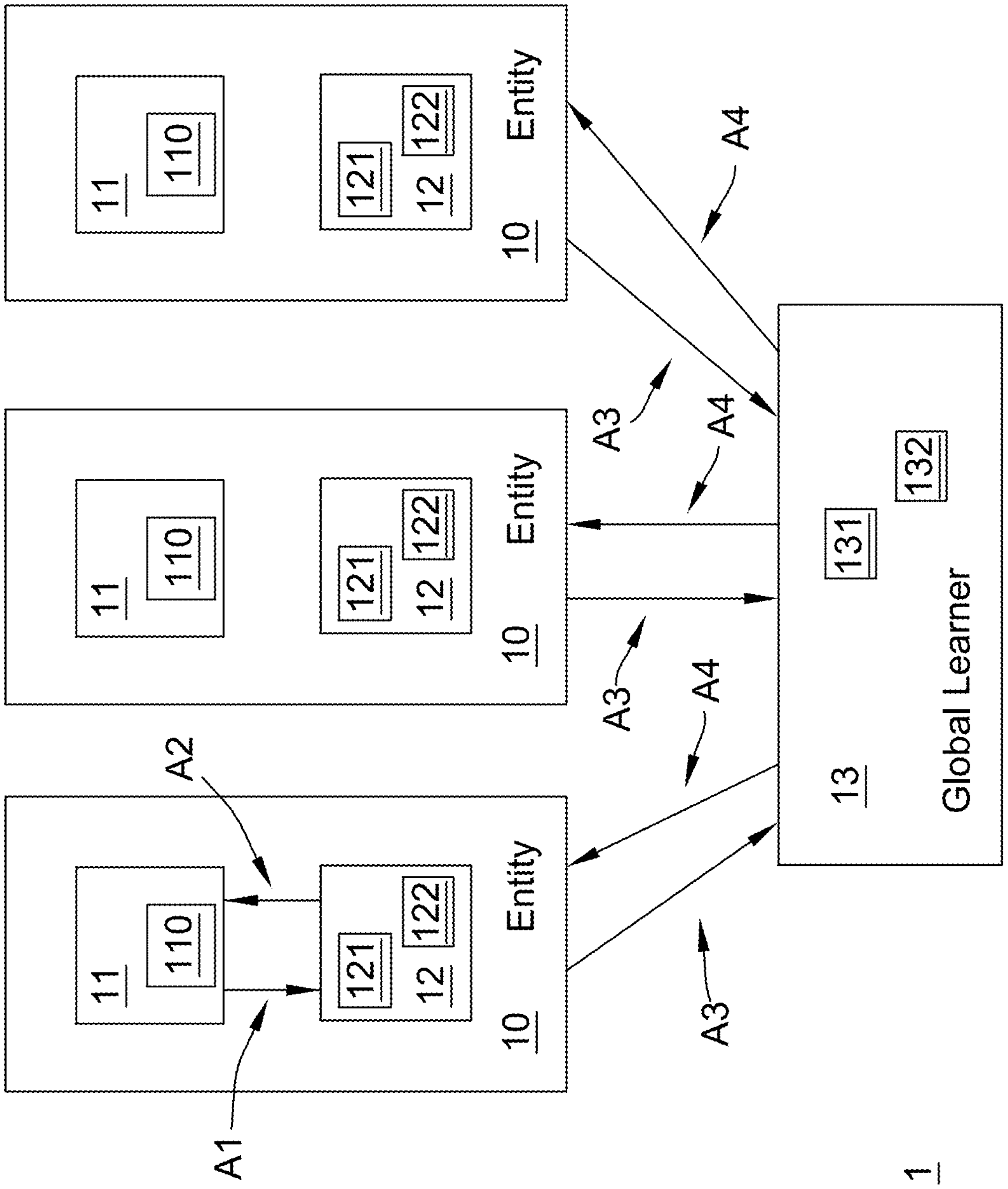
FIG. 2 schematically illustrates an example system according to the disclosure.

FIG. 1 illustrates a method 100 according to the present disclosure. FIG. 2 illustrates an example system 1 according to the disclosure. The method 100 of FIG. 1 may be implemented, at least partly, on the system 1 of FIG. 2.

As illustrated in FIG. 1, the method 100 is for sharing, between a plurality of entities 10 managing cargo, experience of cargo data processing by the plurality of entities 10. In the system 1 of FIG. 2, the entities 10 may manage cargo, e.g. by processing a flux of cargo and the corresponding cargo data.

In some examples the flux of cargo processed by the entities may include a flux of e.g. cargo containers, trains wagons and/or trucks trailers, as non-limiting examples.

In some examples the corresponding cargo data may include at least one of:

- cargo metadata associated with the cargo, such as data contained in cargo documents such as a cargo manifest, the cargo manifest listing e.g. the type of cargo, the weight of the cargo, the recipient of the cargo and the shipper of the cargo, as non-limiting examples, and/or
- inspection data associated with inspection images of the cargo, such as x-ray inspection images, and/or
- inspection metadata relating to the inspection of the cargo, such as reports describing parameters of an inspection of the cargo, e.g. by an inspection system (such as radiation dose, radiation energy, inspection device type, etc.) as non-limiting examples.

In the system 1 of FIG. 2, each entity 10 is separate from each other in the plurality of entities 10. In the system 1, at least one entity 10 managing cargo may be any type of entity managing cargo, such as a port, an airport, a border check point, etc. In some examples at least one entity 10 managing cargo may include a customs organization as a non-limiting example. In the system 1 of FIG. 2, each entity includes a local learner 12 described in more detail later and a local facility 11.

The local facility 11 includes cargo processing means 110 including:

- a memory,
- a processor, and a man/machine interface (including a keyboard, a mouse and a display, as non-limiting examples).

The memory stores data and instructions which, when executed by the processor, enable the processor to process the cargo data corresponding to the flux of cargo managed by the local facility 11.

The cargo data processing performed at the local facility 11 outputs data to an operator of the local facility 11 on the man/machine interface of the cargo processing means 110, such as by displaying at least one of: a cargo manifest, and/or an inspection image of the cargo, and/or a result of an automatic detection of an object of interest in a displayed inspection image. The automatic detection may be performed by a computer-implemented method running on the processing means 110.

The cargo data processing performed at the local facility 11 also takes into account input data from the operator at the local facility 11 on the man/machine interface. The input data may include a selection of pieces of cargo in the flux of cargo for further examination such as, x-ray scanning or manual inspection of the selected cargo, based on the displayed manifest or on the displayed inspection image.

Alternatively or additionally, the input data may include a selection of pieces of cargo in the flux of cargo based on the result of the automatic detection of the object of interest in the displayed inspection image.

The memory of the processing means 110 may further include a database of cargo data, and the cargo data stored in the database may containing data such as:

historical cargo metadata associated with the flux of cargo (such as historical data contained in cargo manifests, as a non-limiting example), and/or historical inspection data associated with inspection images of the cargo, and/or historical inspection metadata.

In some non-limiting examples, the facility 11 may further include at least one of:

a cargo conveyor system, a cargo inspection system, such as an x-ray inspection system including an x-ray source and detectors as non-limiting examples.

The cargo data may be characterised by a large amount of data, corresponding to a large number of inspection images and/or to a large number of pieces of cargo, and limited resources for processing the cargo data, such as a limited number of operators in the facility and/or limited resources for actual inspection of the cargo. To be able to manage the cargo, each of the entities 10 has one or more cargo data processing procedures, as explained below.

In some examples, the amount of cargo managed by each entity 10 is such (e.g. the flux of cargo and the number of cargo containers transiting through a customs organisation) that only a small fraction of the cargo can be inspected. In some examples, the processing of the cargo data includes assessing risks associated with the cargo managed by each entity 10 in the plurality of entities. Assessing risks associated with the cargo is a tool enabling an entity 10 to select suspicious pieces of cargo in a flux of cargo, in order to trigger further examination if the result of the assessment is positive, like, for example, x-rays scanning or manual inspection of the selected cargo. As already stated, the assessment of the risks associated with the cargo is performed on the cargo processing means 110 by at least one operator of the facility 11, and take into account the input of the operator (such as the selection of the suspicious pieces of cargo) on the cargo processing means 110.

Alternatively or additionally, in some embodiments, the processing of the cargo data may include processing x-ray inspection images of the cargo (other types of radiation may be envisaged), in order to automatically detect objects of interest e.g. threats in the inspection images or smuggled goods. In some examples, the threats may include explosives or weapons, and smuggled goods may include cigarettes or drugs. In such examples, the processing of the cargo data may include automatically detecting objects of interest in images of the cargo inspected by each entity and selecting pieces of cargo, for example for further inspection, based on the automatic detecting. As already stated, the automatic detection of an object of interest in an inspection image is performed on the cargo processing means 110. Optionally, the selection by at least one operator of the facility 11 of pieces of cargo, based on the automatic detection, may also be performed on the cargo processing means 110 and may take into account the input of the operator (such as the selection of the suspicious pieces of cargo) on the cargo processing means 110.

In some examples the selecting of the cargo may further include an operator in the entity 10 creating an annotation associated with the selected cargo. The annotation may include an indication whether or not the cargo contained a threat or the assessment was accurate.

As illustrated in FIG. 1, the method 100 includes the local learner 12 of each entity 10 building, at S1, a local model of the cargo data processing by the entity 10. The building of the local model is represented by arrows A1 in FIG. 2. The local model reflects the local cargo data and the local cargo data processing (e.g. local practice regarding the management of the cargo by the entity 10), performed on the cargo processing means 110 as described above.

In embodiments, each local learner 12 may include a machine learning algorithm, such as a neural network, running on a computer including a memory 121 and a processor 122. In some examples, the memory and the processor of the local learner 12 may be, at least partly, shared with the cargo processing means 110 of the local facility 11.

In some embodiments, the machine learning algorithm includes at least one of: deep learning, KMeans, or Federated Forests as non-limiting example. Any machine learning algorithm compatible with federated learning may be envisaged.

The local learning 12 running on the computer builds the local model from input derived from the one or more cargo data processing procedures performed on the cargo processing means 110 described above. In some examples, the local learning 12 may build the local model from the input of one or more operators of the entity 10 when assessing of the risks of the cargo in the entity 10 (such as the selection of suspicious pieces of cargo based on cargo metadata or inspection data). Alternatively or additionally, the local learning 12 may build the local model from the processing of the inspection images of the cargo in the entity 10, such as the automatic detection of the objects of interest in the inspection images and/or the selection of suspicious pieces of cargo by an operator based on the automatic detection.

As also illustrated by arrows A2 in FIG. 2, the local learner 12 of each entity 10 may further be configured to output data about the cargo data processing by the entity 10, based on the built local model. The output data may be data about the assessment associated with the risks in the cargo or data about the automatic detection of the object of interest as non-limiting examples.

As illustrated in FIG. 1, the method further includes a global learner, separate from the plurality of entities 10, obtaining, at S2, at least a first relevant part of the respective local models built by each of the respective local learners.

The global learner is illustrated in FIG. 2 under reference 13. As illustrated by arrows A3 in FIG. 2, the local learner 12 of each entity 10 may transfer the at least a first relevant part of the respective local model. In some examples, the at least first relevant part of the local model is processed before being transferred to the global learner to be adapted to the building a global model. In some embodiments the at least a first relevant part of the respective local model includes the whole of the respective local model.

In some examples, the at least first relevant part of the local model may be encoded before being transferred to the global learner 13, as parameters of the local model, such as neural weights. Alternatively or additionally, in some examples the at least first relevant part of the local model may be encoded before being transferred to the global learner 13 as gradients of the parameters of the local model. The encoding of each of the at least first relevant part of the local model before the transfer to the global learner 13 ensure that no cargo data is transferred on any form to the global learner 13, and experience about the cargo data processing by the plurality of entities may be shared between the plurality of entities 10, in other words every entity 10 benefits from the experience of all of the entities 10, without communication of cargo data or knowledge about the cargo data processing between the plurality of entities 10.

The transfer A3 may be performed over a wired and/or a wireless communications network, which may be a secure communications network.

As illustrated in FIG. 1, the method 100 may further include the global learner 13 building, at S3, a global model of the cargo data processing by the plurality of entities 10, based on the obtained respective first relevant parts of the local models.

The global learner 13 may include a machine learning algorithm, such as a neural network, running on a computer including a memory 131 and a processor 132.

In some embodiments, the machine learning algorithm includes at least one of: deep learning, KMeans, or Federated Forests as non-limiting examples. Any machine learning algorithm compatible with federated learning may be envisaged.

In some embodiments, building at S3 the global model of the cargo data processing includes fusing the respective first relevant parts of the respective local models, e.g. using the machine learning algorithm of the global learner 13.

In some embodiments, fusing the respective first relevant parts of the respective local models includes juxtaposing the respective first relevant parts of the respective local models, e.g. using the machine learning algorithm of the global learner 13. The juxtaposing may involve placing the respective first relevant parts next to each other in the global model and applying a neural layer to the thus placed first relevant parts, as a non-limiting example.

As illustrated in FIG. 1, the method 100 further includes the local learner 12 of each entity obtaining, at S4, at least a second relevant part of the global model built by the global learner 13. The transfer of the at least a second relevant part of the global model is illustrated by arrows A4 in FIG. 2.

In some embodiments, the at least a second relevant part of the global model may be processed before being transferred to the respective local learners 12 to be adapted to the needs of the respective local learners 12. The processing of the at least a second relevant part of the global model ensures that experience about the cargo data processing by the plurality of entities may be shared between the plurality of entities 10, without sharing cargo data or knowledge about the cargo data processing between the plurality of entities 10.

The transfer A4 may be performed over a wired and/or a wireless communications network, which may be a secure communications network. The transfer A4 may be performed over the same communications network as the transfer A3.

As illustrated in FIG. 1, the method 100 further includes the local learner 12 of each entity 10 outputting, at S5, data about the cargo data processing by the entity, based on the obtained second relevant part of the global model. The outputting of the data is illustrated by the arrows A2.

The output A2 of data ensures that experience about the cargo data processing by the plurality of entities is shared between the plurality of entities, without any of the entities transmitting cargo data or knowledge about the cargo data processing to any other entities in the plurality of entities.

In some embodiments, the local learner 12 may update the local model based on the at least a second relevant part of the global model obtained from the global learner 13.

Similarly, the method 100 may be repeated periodically, for example every day or every week as non-limiting examples, so that the local and global models are up to date.

In a very simple non-limiting example application, smugglers may change the route of their trafficking after they notice that customs organisations have suspicions. If a first customs organization has doubt on some cargo, the doubt being related to a shipper and/or a recipient, this will be reflected in the local model of the first customs organization. Thanks to the transfer of the local model to the global learner, this will also be reflected in the global model, and transferred back to other customs organizations. Therefore, if smugglers change their route such that it passes through borders under the control of the other customs organisations, suspicion will be raised immediately, even though the other customs organisations have never been confronted to this situation and have never had access to the cargo data or the knowledge of the cargo processing of the first customs organization. Similarly, experience about automatic detection of objects of interest in inspection images (e.g. x-ray inspection images) may be shared between the entities and, if one of the e.g. customs organizations was able to automatically detect an object of interest, the object of interest may be automatically detected by another entity, even though the other entity has never been confronted to this situation and has never had access to the cargo data or the knowledge of the cargo processing of the other entities.

The method of the disclosure may be used in connection with a cloud multi-function platform for the plurality of entities, including other functionalities like image indexing, automated threat detection that could enriched the result of the risk assessing, at a global or local level.

It will be appreciated from the discussion above that the embodiments shown in the Figures are merely exemplary, and include features which may be generalised, removed or replaced as described herein and as set out in the claims.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the functionality of the controller described herein may be provided by mixed analogue and digital processing and/or control functionality. It may include a general purpose processor, which may be configured to perform a method according to any one of those described herein. In some examples the controller may include digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media including program instructions operable to program a processor to perform any one or more of the methods described and/or claimed herein and/or to provide data processing apparatus as described and/or claimed herein. The controller may include an analogue control circuit which provides at least a part of this control functionality. An embodiment provides an analogue control circuit configured to perform any one or more of the methods described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims. These claims are to be interpreted with due regard for equivalents.

The invention claimed is:

1. A computer-implemented method for sharing, between a plurality of entities managing cargo, experience of cargo data processing by the plurality of entities, each entity being separate from each other in the plurality of entities, the method comprising:

a local learner of each entity building a local model of the cargo data processing by the entity in the plurality of entities, the local learner of each entity being further configured to output data about the cargo data processing by the entity, based on the built local model;

a global learner, separate from the plurality of entities, obtaining at least a first relevant part of the respective local models built by each of the respective local learners, wherein the at least a first relevant part of the local model is encoded as parameters including neural weights of the local model prior to being obtained by the global learner to ensure that no cargo data based on which the cargo data processing is performed is transferred to the global learner;

the global learner building a global model of the cargo data processing by the plurality of entities, based on the obtained respective first relevant parts of the local models;

the local learner of each entity obtaining at least a second relevant part of the global model built by the global learner; and the local learner of each entity outputting data about the cargo data processing by the entity in the plurality of entities, based on the obtained second relevant part of the global model, such that experience of the cargo data processing by the plurality of entities is shared between the plurality of entities, without any of the entities communicating cargo data or knowledge about the cargo data processing between the plurality of entities.

2. The method of claim 1, wherein building the global model of the cargo data processing comprises fusing the respective first relevant parts of the respective local models.

3. The method of claim 2, wherein fusing the respective first relevant parts of the respective local models comprises juxtaposing the respective first relevant parts of the respective local models.

4. The method of claim 1, wherein each local learner comprises a machine learning algorithm, such as a neural network, running on a computer comprising a memory and a processor.

5. The method of claim 4, wherein the machine learning algorithm comprises at least one of: deep learning, KMeans, or Federated Forests.

6. The method of claim 1, wherein the global learner comprises a machine learning algorithm, such as a neural network, running on a computer comprising a memory and a processor.

7. The method of claim 6, wherein the machine learning algorithm comprises at least one of: deep learning, KMeans, or Federated Forests.

8. The method of claim 1, wherein the processing of the cargo data comprises assessing risks associated with the cargo managed by each entity in the plurality of entities.

9. The method of claim 8, wherein assessing the risks triggers:

selecting pieces of cargo in a flux of cargo for further examination such as, x-ray scanning or manual inspection of the selected cargo.

10. The method of claim 1, wherein the processing of the cargo data comprises:

automatically detecting objects of interest in images of the cargo inspected by each entity in the plurality of entities, the objects of interest comprising objects such as threats or smuggled goods; optionally further comprising:

selecting pieces of cargo, based on the automatic detection.

11. The method of claim 10, wherein the selecting of the cargo further comprises an operator in the entity creating an annotation associated with the selected cargo.

12. The method of claim 1, repeated periodically.

13. The method of claim 1 wherein the at least a first relevant part of the respective local model comprises the whole of the respective local model.

14. The method of claim 1, wherein the local learner of each entity obtaining the at least a second relevant part of the global model further comprises updating the local model based on the at least a second relevant part of the global model.

15. The method of claim 1, wherein the at least a first relevant part of the local model is:

encoded before being transferred to the global learner as gradients of the parameters of the local model.

16. The method of claim 1, wherein the at least a second relevant part of the global model is processed before being transferred to the respective local learners to be adapted to the needs of the respective local learners.

17. The method of claim 1, wherein at least one entity managing cargo comprises a customs organization.

18. A system comprising:

a processor; and a memory comprising instructions which, when executed by the processor, enable the system to perform the method of claim 1.

19. A computer program or a computer program product embodied in a non-transitory computer readable medium and comprising instructions which, when executed by a processor, enable the processor to perform the method of claim 1.

* * * * *